May 16, 1933.   HANS-CAESAR STUHLMANN   1,909,235
CUTTING DEVICE
Filed Oct. 9, 1930   2 Sheets-Sheet 1
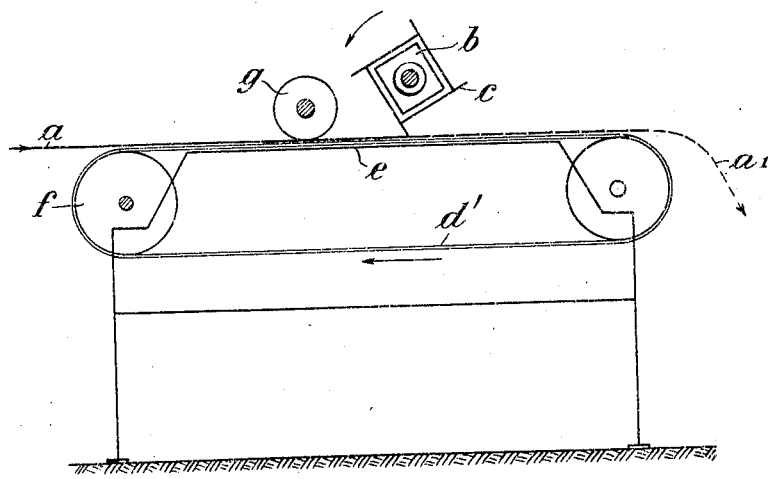

May 16, 1933. HANS-CAESAR STUHLMANN 1,909,235
CUTTING DEVICE
Filed Oct. 9, 1930  2 Sheets-Sheet 2

Patented May 16, 1933

1,909,235

UNITED STATES PATENT OFFICE

HANS-CAESAR STUHLMANN, OF PREMNITZ, WESTHAVELLAND, GERMANY, ASSIGNOR TO I. G. FARBENINDUSTRIE AKTIENGESELLSCHAFT, OF FRANKFORT-ON-THE-MAIN, GERMANY

CUTTING DEVICE

Application filed October 9, 1930, Serial No. 487,562, and in Germany November 21, 1929.

My present invention relates to cutting machines. One of its objects is to provide a new cutting machine adapted to cut into equal lengths an artificial fiber band continuously fed to the cutter.

Further objects of my invention will be clearly seen from the detailed specification following hereafter. Reference is made to the accompanying drawings in which Fig. 1 shows a sectional view of my cutting device, the knives being tangentially mounted on the rotating shaft.

Fig. 2 shows a bundle of staple fibers cut by my machine and

Figure 3:
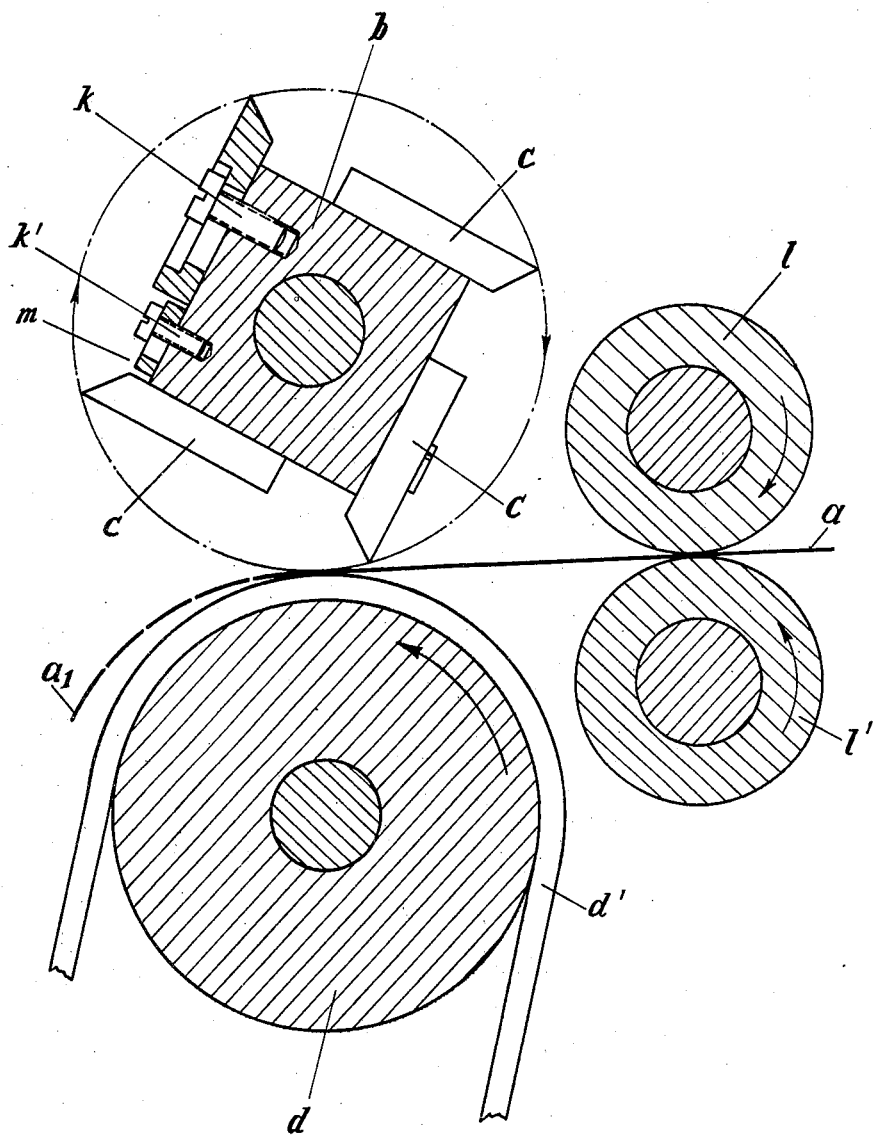
Fig. 3 shows in cross-section the arrangement of tangentially mounted knives.

The whole crux of my invention will become clear by a short discussion of the prior art.

Various methods are known to produce in a continuous process thick bundles of artificial fibers consisting of about 75,000 individual fibers, to after-treat, and to dry them. Such a process of manufacturing a finished thick bundle of artificial threads in an uninterrupted operation with a constant speed of about 50 to 60 meters per minute is the subject matter of the U. S. application Ser. No. 361,490, filed May 8, 1929, by myself and Otto Weitermann.

In order to be worked up into textile products similar to wool or cotton, these practically endless fiber bundles are cut into short pieces of about the length of a cotton or wool staple, that is, of about 3 to 6 cm. When combining the cutting operation with the spinning and after-treating processes, difficulties arise in obtaining uniform staples while avoiding any waste at the speed with which the threads are fed to the cutting device, this speed amounting to about 40 to 60 meters or even up to 100 meters per minute.

It has been proposed to cut the said thick fiber strips into pieces by allowing rotating knives to cut along the edge of a solid base thus cutting the fiber strips as they are displaced along the base. A device of this kind, however, does not permit one to cut the fibers into completely uniform pieces, because parts of the fibers yield before the knives and move vertically to the strip. Another drawback of the device described resides in the fact that when cutting at right angles to the direction of movement of the fibers they will accumulate at the knives.

The method of operation and the construction of my cutting device is as follows:

The artificial fiber bundle is cut on a moving elastic support by means of knives rotating in the same direction as that of the movement of the fiber band. By this similar movement, all the fibers are cut into pieces of uniform length without damage to the elastic base by the knives. The knives cannot be damaged either so that for this reason no irregular cutting will occur. By displacing the support and consequently the fiber bundle, and the rotating knives at different speeds, a cut may be obtained which is more or less inclined according to requirements. To avoid, however, any accumulation of the threads at the knives, especially when cutting thick fiber bundles, the peripheral velocity of the knives measured at a distance from the edges of the knives which corresponds to the thickness of the fiber bundle, is at least equal to the velocity at which the bundle is conveyed. Cutting devices for the purpose set forth may be constructed, for instance, as seen from the accompanying drawings.

In order to obtain a diagonal cut, a device of the kind illustrated in Fig. 1 is preferably used. In this device knives $c$ in any number are not fixed in a radial but in a tangential position to the cutting roller $b$. In this case, an elastic transport band $d'$ is used. The elastic band $d'$ is moved by driven rollers $f$ and is kept in a horizontal position by means of a fixed table $e$. A revolving pressure roller $g$ serves to hold together the fiber band $a$. The cutting plane of the cut pieces becomes the more inclined the more the peripheral speed of the knife $c$ increases in comparison with the speed of movement of the supporting band $d'$ and consequently of the fiber band $a$. The fiber band cuttings or staples $a_1$ produced by means of a device constructed according to Fig. 1 have, for instance, the form indicated in Fig. 2. By varying the number of the knives $c$ and controlling the moving velocities of the band $a$ and of the knives $c$, any length of the single fibers $h$ and of the cutting plane $e$ can be obtained, this latter ensuring a better overlapping when working up the material into textile products. The degree of convexity of the cutting plane $i$ is dependent upon the curve of the circle of knives in conjunction with the relative velocity of the fiber band.

Fig. 3 shows a combination of feed rolls with the device illustrated in Fig. 1. In this device the knives $c$ are adjustably fastened to a rotatable polygonal body by means of a screw $k$ and secured in their position by an adjustable stop $m$ likewise held by a screw $k'$. $d$ is a roller over which the endless elastic band $d'$ is moved, which is held under proper tension by guiding it over another roller (not shown). In this case, likewise, the tangentially fixed knives are adjusted in such a manner that in their lowest position they just touch the surface of the elastic band $d'$. The fiber band $a$ is fed by guiding and pressure rolls $l$ and $l'$ at about the same velocity as that at which the elastic bend $d'$ runs. In Fig. 3 the direction of rotation of the revolving parts, is indicated by arrows.

For sake of clarity I have shown in the drawings only those parts of my device the action of which is important to produce the desired result. The cog wheels, bearings, driving belts, framings, transmissions of power, weight rods and similar parts are omitted as those constructions are familiar to all skilled in the art.

As seen from the drawings, my devices are distinguished by their simple construction. On this account, they are very suitable for cutting thick artificial fiber bundles continuously produced and finished in an uninterrupted operation. The knives of such a cutting machine have to rotate at a high speed. If, for instance, the fiber bundle is fed to the cutting device at a speed of 46 meters per minute, 1000 revolutions per minute of the knife roller shown in Fig. 3 are necessary in order to obtain a staple length of 40 mm. This requirement is completely fulfilled by the simple construction of my devices.

What I claim is:—

1. A device for cutting continuously spun bundles of artificial fibers comprising an elastic transport band, means for moving the said transport band, rotating knives above said transport band, a rotating body with the knives tangentially mounted thereon, said knives running in the same direction as the fiber band is moved on the transport band, and just touching on their lowest point of rotation the surface of the elastic transport band.

2. A device for cutting continuously spun bundles of artificial fibers comprising an elastic, inclined, endless transport band held under tension by two rollers arranged in different height, rotating knives above the upper roller, a rotating body with the knives tangentially mounted thereon, said knives running in the same direction as the fiber band is moved on the transport band, and just touching on their lowest point of rotation the surface of the elastic transport band.

In testimony whereof, I affix my signature.

HANS-CAESAR STUHLMANN.